(12) United States Patent  (10) Patent No.: US 7,089,819 B2
Yabe et al.  (45) Date of Patent: Aug. 15, 2006

(54) LINEAR GUIDE APPARATUS

(75) Inventors: Takayuki Yabe, Gunma (JP); Masato Katou, Gunma (JP)

(73) Assignee: NSK Ltd., Tokyo (JP)

( * ) Notice: Subject to any disclaimer, the term of this patent is extended or adjusted under 35 U.S.C. 154(b) by 503 days.

(21) Appl. No.: 10/443,877

(22) Filed: May 23, 2003

(65) Prior Publication Data
US 2004/0016312 A1    Jan. 29, 2004

(30) Foreign Application Priority Data
May 23, 2002 (JP) .................. P. 2002-149501
May 28, 2002 (JP) .................. P. 2002-153937

(51) Int. Cl.
F16H 27/02 (2006.01)

(52) U.S. Cl. ..................... 74/89.4; 74/89.44

(58) Field of Classification Search ............... 74/89.32, 74/89.33, 89.4, 89.44
See application file for complete search history.

(56) References Cited
U.S. PATENT DOCUMENTS 5,722,294 A * 3/1998 Kobayashi et al. .......... 74/89.4
5,906,136 A * 5/1999 Yabe et al. ............... 74/424.72
6,142,030 A * 11/2000 Nagai et al. ................ 74/89.32
6,199,440 B1 * 3/2001 Greubel et al. ............ 74/89.23
6,276,225 B1    8/2001 Takeda et al.

FOREIGN PATENT DOCUMENTS

| DE | 29 28 717 A1 | 1/1981 |
| DE | 43 02 054 A1 | 7/1994 |
| GB | 2 223 282 A | 4/1990 |
| JP | 5-44810 A | 2/1993 |

* cited by examiner

Primary Examiner—David Fenstermacher
(74) Attorney, Agent, or Firm—Sughrue Mion, PLLC

(57) ABSTRACT

A ball screw has a screw shaft including a screw groove formed in an outer peripheral surface thereof; a nut including a screw groove formed in an inner peripheral surface thereof and screwed together with the screw shaft through a large number of balls rollably disposed in a spiral-shaped ball rolling passage formed by the two screw grooves; and, two seals respectively disposed on the two end portions of the nut for sealing the opening of a clearance between the screw shaft and the nut, wherein two annular grooves are respectively formed in the inner peripheral surfaces of the two end portions of the nut, each of the seals is formed in a substantially annular-ring shape having an outside diameter larger than the inside diameter of the nut and the seals are mounted into the nut by fitting the outer edge portions of the seals into the annular grooves.

13 Claims, 11 Drawing Sheets

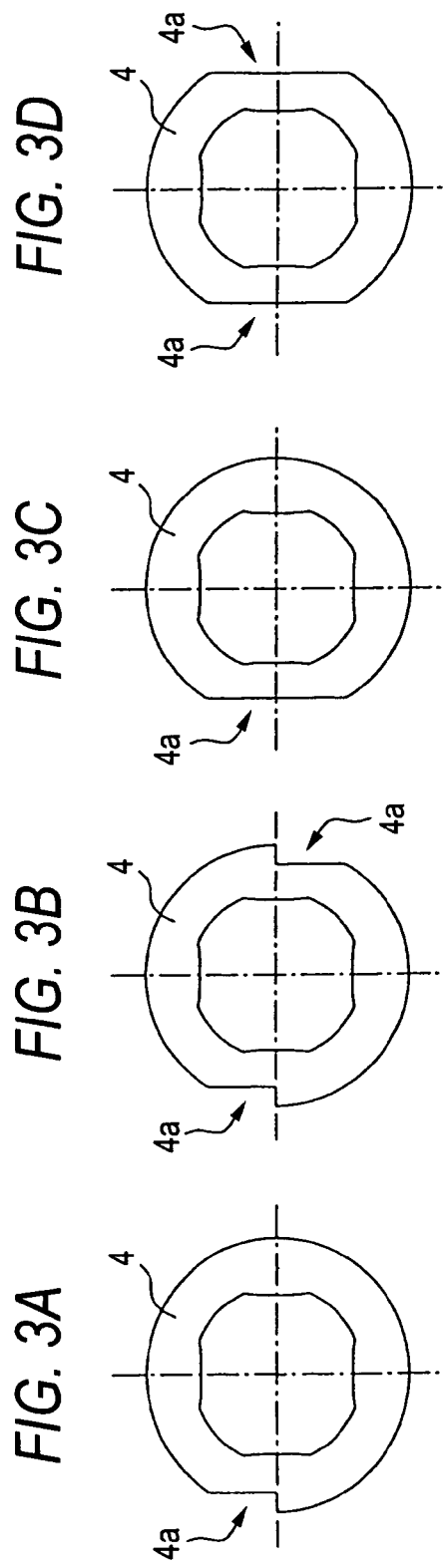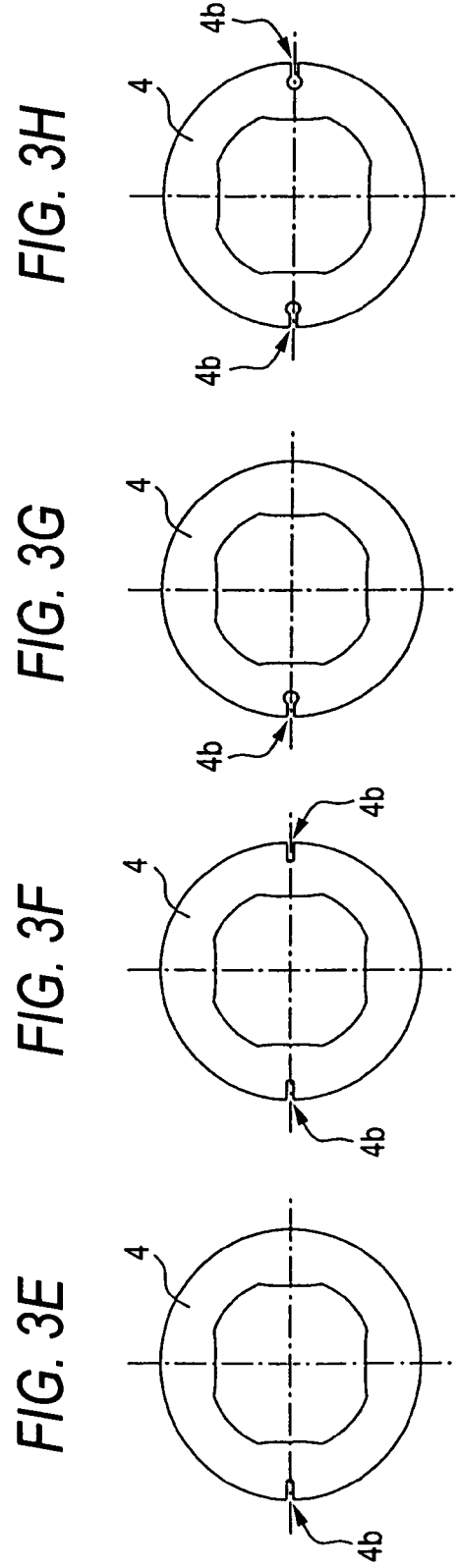

LINEAR GUIDE APPARATUS

BACKGROUND OF THE INVENTION

1. Field of the Invention

The present invention relates to a linear guide apparatus such as a ball screw, a ball spline and a linear guide.

The present invention also relates to a ball screw and, in particular, to a ball screw which is easy to incorporate a seal thereinto and is excellent in the reliability and sealing performance of the seal.

2. Description of the Related Art

A ball screw is composed of a screw shaft and a nut screwed together with the screw shaft; and, in the outer peripheral surface of the screw shaft and in the inner peripheral surface of the nut, there are formed spiral-shaped screw grooves which are disposed opposed to each other. And, in a spiral-shaped ball rolling passage formed by and between the two screw grooves, there are disposed a large number of balls in such a manner that they are allowed to roll along the ball rolling passage, while the screw shaft and nut can be moved in the axial direction thereof with respect to each other through the rolling movements of the large number of balls.

Also, on the two end portions of the nut, there are disposed two seals which are used to seal the opening of a clearance between the screw shaft and nut. And, the two seals are respectively fixed to the nut by bolts which are inserted into axially-extending holes formed in the end face of the nut.

However, the above-mentioned conventional seal fixing method has a problem that it takes the number of man-hour to assemble the ball screw. Also, in order to secure the reliability of the seal, it is necessary to take such special measures as to be able to prevent the seals from being removed from the nut.

Conventionally, as a ball screw for use in a machine tool or the like, for example, there is also known a ball screw which is disclosed in JP-A-5-44810. A ball screw of this type includes a cylindrical-shaped nut to be fitted with the outer periphery of a screw shaft, while a spiral-shaped rolling element rolling groove is formed in the outer peripheral surface of the screw shaft. This rolling element rolling groove is disposed opposed to a rolling element rolling groove which is formed in the inner peripheral surface of the nut. In case where either the screw shaft or nut is rotated, a large number of rolling elements (balls) incorporated into the nut are allowed to roll between the above two rolling element rolling grooves.

In the thus-structured conventional ball screw, in case where a foreign substance such as cut powder gets into between the screw shaft and nut, there is a possibility that the groove surfaces of the rolling element rolling grooves and the surfaces of the rolling elements can be damaged by the foreign substance. In view of this, conventionally, annular-shaped sealing members each made of resin are mounted on the two ends of the nut and the inner periphery edge portions of the sealing members are slidingly contacted with the rolling element rolling groove of the screw shaft to thereby prevent the invasion of the foreign substance into between the screw shaft and nut.

However, in case where the above-mentioned annular-shaped sealing members are mounted on the two ends of the nut, the interior of the nut is hermetically sealed by the annular-shaped sealing members, which provides a state in which the air is sealed in the interior of the nut. In this state, even in case where a lubricant such as grease is supplied to the rolling element rolling groove of the nut from a lubricant supply hole formed in the nut, the air sealed in the interior of the nut impedes the supply of the lubricant, which makes it difficult to supply the lubricant uniformly over the entire area of the rolling element rolling groove of the nut.

Also, in case where the thickness of the annular-shaped sealing members to be mounted on the two ends of the nut is small (for example, about 0.5 mm), when the lubricant is supplied into the interior of the nut, the air sealed in the interior of the nut deforms the annular-shaped sealing members elastically to thereby fulfill the function of a valve body. This generates a pressure difference between the interior and exterior of the nut and, due to the pressure difference, there is a fear that the lubricant can leak from the surface of the rolling element rolling groove or a foreign substance can be sucked into the rolling element rolling groove surface.

SUMMARY OF THE INVENTION

In view of the above, the present invention aims at eliminating the drawbacks found in the above-mentioned conventional ball screw. Accordingly, it is a first object of the present invention to provide a ball screw which not only can facilitate the incorporation of the seals but also is excellent in the reliability and sealing performance of the seals.

Accordingly, it is a second object of the present invention to provide a linear guide apparatus which, even in case where the interior of a movable body is sealed by sealing members mounted on the two ends of the movable body, is able to supply a lubricant uniformly over the entire area of a rolling element rolling groove formed in the movable body.

In attaining the first object, the present invention has the following structure. According to a first aspect of the present invention, there is provided that a ball screw haing a screw shaft including a spiral-shaped screw groove formed in an outer peripheral surface thereof; a nut including a spiral-shaped screw groove formed in an inner peripheral surface thereof so as to be opposed to the screw groove of the screw shaft and screwed together with the screw shaft through a large number of balls rollably disposed in a spiral-shaped ball rolling passage formed by the two screw grooves; and, two seals respectively disposed on the two end portions of the nut for sealing the opening of a clearance between the screw shaft and the nut, wherein two annular grooves are respectively formed in the inner peripheral surfaces of the two end portions of the nut, the seal is formed in a substantially annular-ring shape having an outside diameter larger than the inside diameter of the nut and the seals are mounted into the nut by fitting the outer edge portions of the seals into the annular grooves.

In case where the seals are mounted by fitting the outer edge portions thereof into the annular grooves formed in the inner peripheral surfaces of the two end portions of the nut in the above-mentioned manner, there are present on the axial-direction outside of the seals which hold the seals, thereby being able to substantially eliminate the fear that the seals can be removed from the nut during use of the ball screw. Also, since the seals can be assembled into the nut simply and the number of man-hours for assembling the ball screw is small, the ball screw can be manufactured at a low cost.

Also, in the above construction, it is preferable that in the inner peripheral surfaces of the two end portions of the nut, seal introduction grooves which allow the end face of the nut and the annular grooves to communicate with each other are formed.

In the case of the present structure, after the outer edge portions of the seals are inserted into the seal introduction grooves, by rotating the seals on their own axes, the seals can be fitted into the seal introduction grooves, which can further facilitate the assembling of the seals into the nut.

Further, it is also preferable that at least one cut-away portion or slit is formed in the outer edge portion of the seal.

According to the present structure, since the outer edge portions of the seals can be inserted into the seal introduction grooves using the cut-away portions or slits, the seals can be assembled into the nut more easily. Also, because the present structure allows easy assembly of even seals the flexibility of which is not so high, there can be obtained the high sealing performance of the seals.

Further, it is preferable that elastic member having a substantially C-shape is fitted together with the seals into the annular grooves to thereby fix the seal to the nut, the seal is fixed to the nut by using screws or pins, a ventilation hole or a ventilation slit is formed in the seal, and the interior and exterior of the nut are allowed to communicate with each other through the ventilation hole or the ventilation slit, and the seal includes a closing member so as to close the ventilation hole or the ventilation slit during the operation of the ball screw.

In case where the seals are fixed to the nut according to these method, there is no fear that the seals can be removed from the nut during use of the ball screw. Also, there is no fear either that the seals can be rotated during use of the ball screw.

In attaining the second object, according to a second aspect of the present invention, there is provided a linear guide apparatus having a guide shaft including a spiral-shaped or linear-shaped rolling element rolling groove; a movable body including a spiral-shaped or linear-shaped rolling element rolling groove opposed to the rolling element rolling groove of the guide shaft; and, a large number of rolling elements interposed between the two rolling element rolling grooves of the guide shaft and movable body, wherein sealing members are mounted on the two ends of the movable body and the sealing members are slidingly contacted with the guide shaft to thereby seal the clearance between the guide shaft and movable body, wherein a ventilation hole or a ventilation slit is formed in each of the sealing members, and the interior and exterior of the movable body are allowed to communicate with each other through the ventilation hole or ventilation slit.

In the above construction, it is preferable that the sealing member includes a closing member so as to close the ventilation hole or the ventilation slit during the operation of the linear guide apparatus.

According to the present structure, even in case where the interior of the movable body is sealed by the sealing members, the air sealed into the interior of the movable body can be made to escape therefrom to the outside of the movable body, thereby being able to supply a lubricant uniformly over the entire area of the rolling element rolling groove of the movable body. Also, when the lubricant is supplied to the interior of the movable body from the lubricant supply hole, there is eliminated the possibility that the sealing members can be elastically deformed by the air sealed into the movable body to thereby generate a pressure difference between the interior and exterior of the movable body, which makes it possible not only to prevent the lubricant from leaking from the rolling element rolling groove surfaces but also to prevent a foreign substance from being sucked into the rolling element rolling grooves.

BRIEF DESCRIPTION OF THE DRAWINGS

FIGS. 3A to 3H are explanatory views of the shape of the seal;

FIG. 21A is a front view of a Labyrinth seal for sealing a clearance between a screw shaft and a nut, and FIG. 21B is a section view of the Labyrinth seal.

DETAILED DESCRIPTION OF THE PREFERRED EMBODIMENTS

Now, description will be given below in detail of an embodiment of a ball screw according to the present invention with reference to the accompanying drawings. By the way, the present embodiment is just an example of the present invention and thus the present invention is not limited to the present embodiment.

Figure 1:
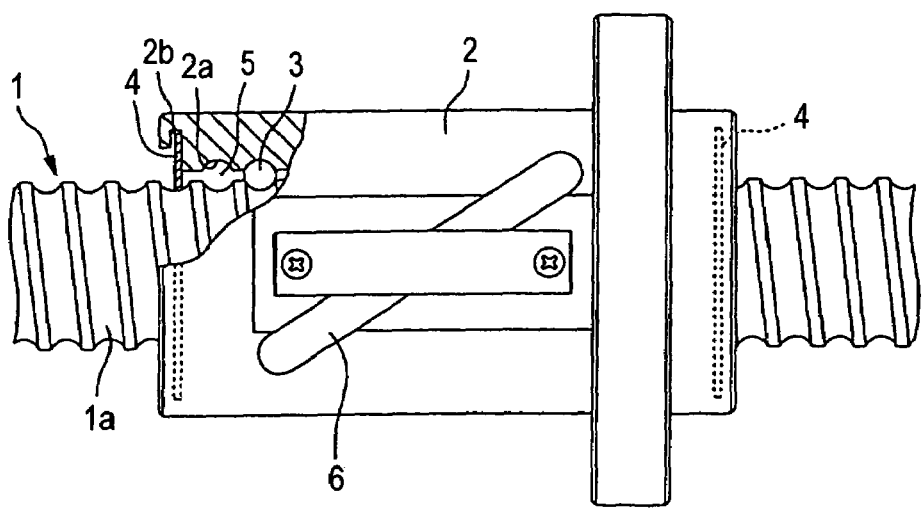
FIG. 1 is a partially broken plan view of an embodiment of a ball screw according to the present invention.

In FIG. 1, a ball screw comprises a screw shaft 1 including a spiral-shaped screw groove 1a formed in the outer peripheral surface thereof, a cylindrical-shaped nut 2 which includes a spiral-shaped screw groove 2a formed in the inner peripheral surface thereof so as to be opposed to the screw groove 1a of the screw shaft 1 and also which can be screwed together with the screw shaft 1, and a large number of balls 3 rollably disposed in a spiral-shaped ball rolling passage 5 formed by and between the screw groove 1a of the screw shaft 1 and the screw groove 2a of the nut 2. By the way, the section of each of the screw grooves 1a, 2a may have an arc-shape or a Gothic-arc-shape.

Also, on the axial-direction two end portions of the nut 2, there are mounted seals 4, 4 which are used to seal the opening of a clearance between the screw shaft 1 and nut 2. Each of the seals 4 has a substantially annular-ring shape having an outside diameter larger than the inside diameter of the nut 2; and, by fitting the outer edge portions of the seals 4 into their associated annular grooves 2b respectively formed in the inner peripheral surfaces of the two end portions of the nut 2, the seals 4 can be mounted onto the two end portions of the nut 2.

Further, a return tube 6, which is bent formed in a substantially U-like shape, is mounted on the outer surface of the nut 2. The two ends of the return tube 6 penetrate through the nut 2 and reach the ball rolling passage 5, so that the balls 3 rolling within the ball rolling passage 5 are allowed to circulate through the return tube 6. That is, after the balls 3 have moved within the ball rolling passage 5 and have gone around the screw shaft 1 two or more times, they are scooped up in one end (which is a point of intersection between the end portion of the return tube 6 and ball rolling passage 5) of the ball rolling passage 5 from one end portion (opening) of the return tube 6 into the return-tube 6. In such scoop-up operation, the balls 3 are scooped up into the return tube 6 in such a manner that the balls 3 are collided with a tongue portion (not shown) projectingly provided on the end portion of the return tube 6. After scooped up, the balls 3 pass through the interior of the return tube 6 and are then returned from the other end portion (opening) of the return tube 6 to the other end of the ball rolling passage 5. And, the nut 2, which is screwed together with the screw shaft 1 through the balls 3, and the screw shaft 1 are moved with respect to each other in the axial direction thereof through the rolling movements of the large number of balls 3.

Next, description will be given below in detail of the method for mounting the seals 4 onto the nut 2 with reference to FIGS. 2A–4D.

Figure 2A:
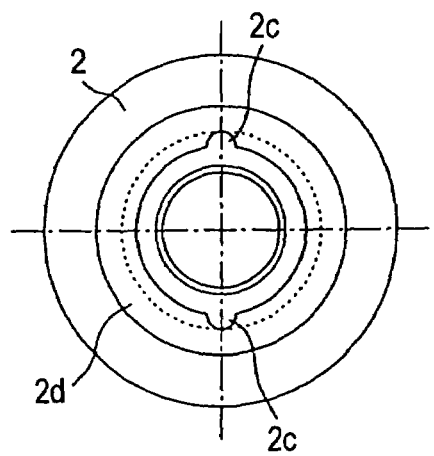
FIGS. 2A and 2B are a front view and a partially broken side view of a nut before a seal is mounted into the nut.

As shown in FIGS. 2A (which is a front view of the nut 2) and 2B (which is a side view of the nut 2), in the inner peripheral surfaces of the two end portions of the nut 2, there are formed seal introduction grooves 2c, 2c which allow the end face 2d and annular groove 2b of the nut 2 to communicate with each other. Also, as shown in FIG. 3B, on the outer edge portion of the seal 4, there are formed two cut-away portions 4a, 4a.

Using the cut-away portion 4a, the outer edge portion (the edge portion of the cut-away portion) of the seal 4 is inserted into the seal groove 2c and, in this state, in case where the seal 4 is rotated on its own axis more than half times, the seal 4 can be fitted into the annular groove 2b easily (see FIGS. 4A, 4B, 4C and 4D). Also, in case where the cut-away portion 4a is present in the seal 4, even when the; seal 4 is not so flexible, the seal 4 can be assembled into the nut 2 easily. Therefore, a high-rigidity seal can be used, which makes it possible to enhance the sealing performance of the seal.

By the way, the shape of the seal 4 is not limited to the shape shown in FIG. 3B, but the shape and number of cut-away portions 4a may also be as shown, for example, in FIGS. 3A, 3C and 3D, provided that the outer edge portion of the seal 4 can be inserted into the seal introduction groove 4c smoothly. For example, as shown in FIGS. 3E to 3H, slits 4b may be formed instead of the cut-away portions 4a.

Figure 2B:
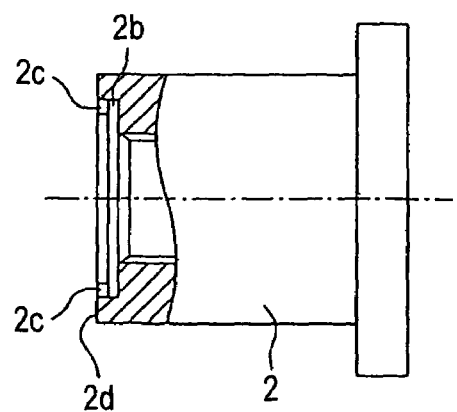
Figure 4A:
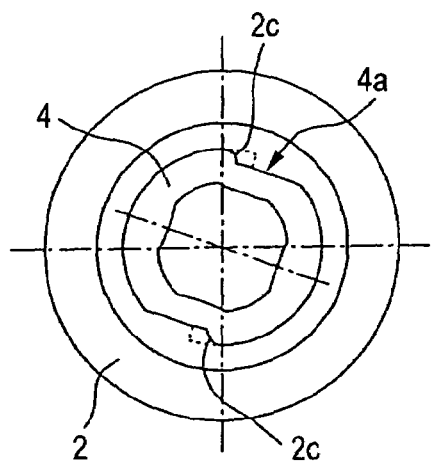
FIGS. 4A to 4D are front views and partially broken side views of the nut, explaining a method for mounting the seal into the nut.
Figure 4B:
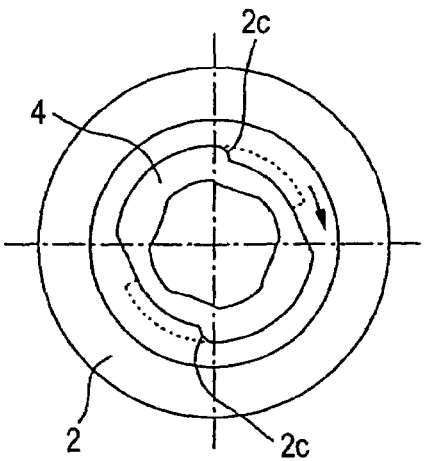
Figure 4C:
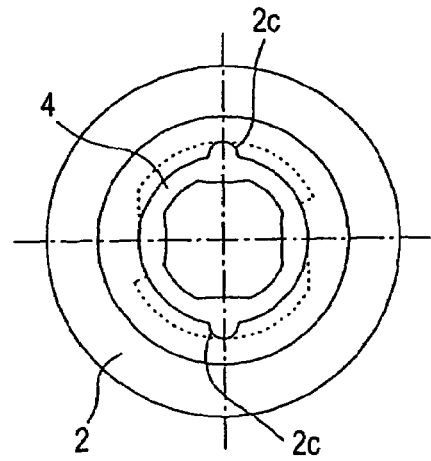
Figure 4D:
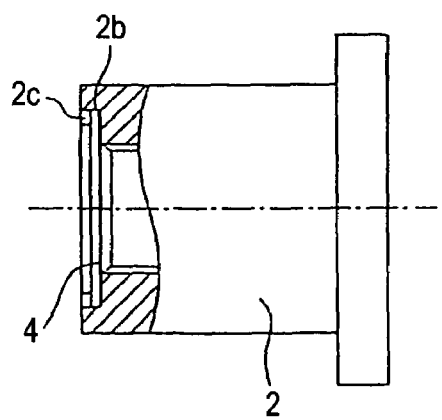

Also, in the example shown in FIGS. 2A and 2B, the number of seal introduction grooves 2c is two; however, the number may be one or three or more. Further, although the shape of the seal introduction groove 2c when viewed from the axial direction thereof is a semi-circular shape, the shape of the seal introduction groove 2c may also be any other shape such as a slit-like shape, provided that it permits easy insertion of the outer edge portion of the seal 4.

Figure 5A:
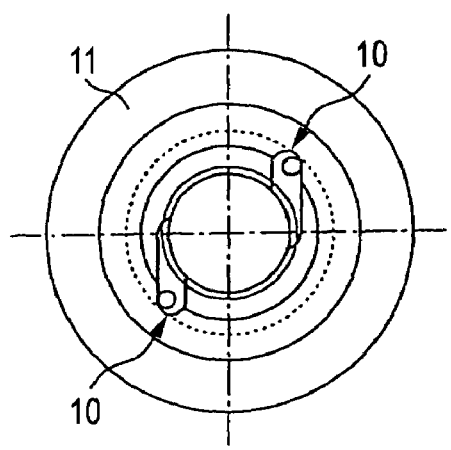
FIGS. 5A and 5B is a front view and a partially broken side view of a nut used in a ball screw of a type in which balls are allowed to circulate using a circulation frame, showing a state in which a seal is mounted into the nut.
Figure 5B:
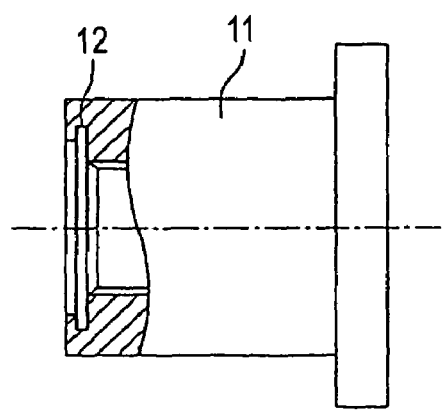

Still further, in the case of a ball screw (see FIG. 5) in which balls are allowed to circulate using a circulation frame instead of the return tube 6, a seal can be fitted into a annular groove 12 using, as seal introduction grooves, slits 10 which are used to assemble the circulation frame (not shown) to a nut 11. Thus, in this case, it is not necessary to form a seal introduction groove in the nut 11. By the way, although the necessary number of slits for the circulation frame is one or two, three or more slits may also be formed.

Next, description will be given below of a method for fixing the seal 4, which has been fitted into the annular groove 2b in the above-mentioned manner, to the nut 2.

Figure 6:
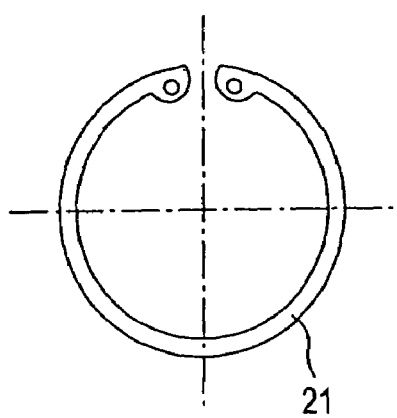
FIG. 6 is a plan view of a substantially C-shaped elastic member.
Figure 7A:
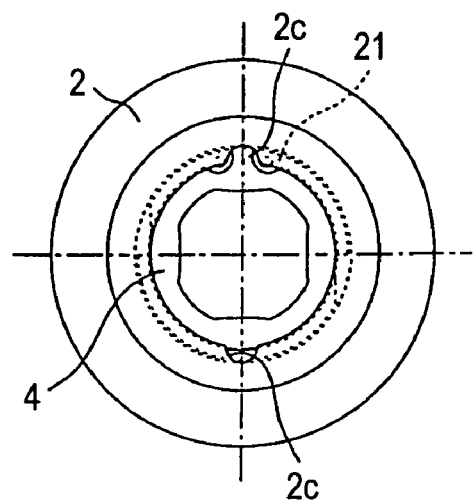
FIGS. 7A and 7B are a front view and a partially broken side view of a ball screw of a type in which a seal is fixed using an elastic member.
Figure 7B:
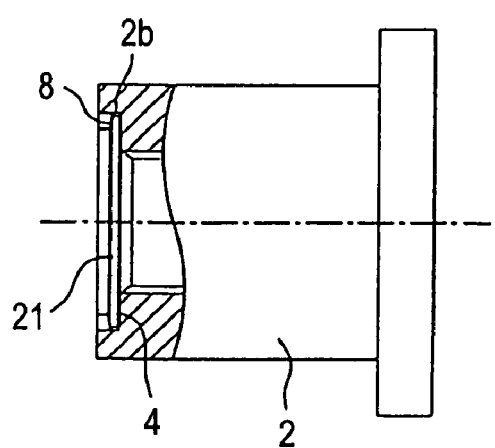

Firstly, description will be given below of a case using an elastic member. Here, FIG. 6 is a plan view of an elastic member 21. Also, FIG. 7A is a front view of a ball screw in which the seal 4 is fixed using the elastic member 21, and FIG. 7B is a partially broken side view of the present ball screw. By the way, in FIG. 7, illustration of the screw shaft is omitted.

The two end portions of the elastic member 21 having a substantially C-like shape are pressed inwardly in the diameter direction of the elastic member 21 to thereby turn the elastic member 21 into a state in which the diameter of the elastic member 21 is smaller than the diameter thereof when it is not pressed. In this state, the elastic member 21 is fitted together with the seal 4 into the annular groove 2b. In this fitting operation, the elastic member 21 is disposed on the end portion side of the nut 2. Of the two wall surfaces that form the annular groove 2b, the wall surface 8 on the end portion side of the nut 2 is gradually inclined inwardly in the diameter direction of the nut 2 on the end portion side thereof and thus, due to the tapered (inclined) shape, a pressing force is applied to the elastic member 21 so that the seal 4 is pressed against and fixed to the nut 2.

In case where the seal 4 is fixed to the nut 2 in this manner, there is no fear that the seal 4 can be removed from the nut 2 during use of the ball screw. Also, there is no fear that the seal 4 can be rotated during use of the ball screw.

Figure 8:
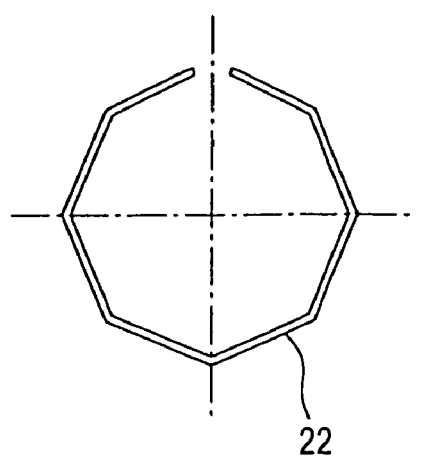
FIG. 8 is a plan view of another elastic member.
Figure 9A:
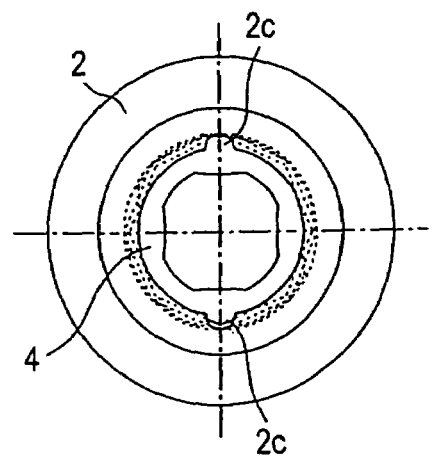
FIGS. 9A and 9B are a front view and a partially broken side view of a ball screw of a type in which a seal is fixed using another elastic member.
Figure 9B:
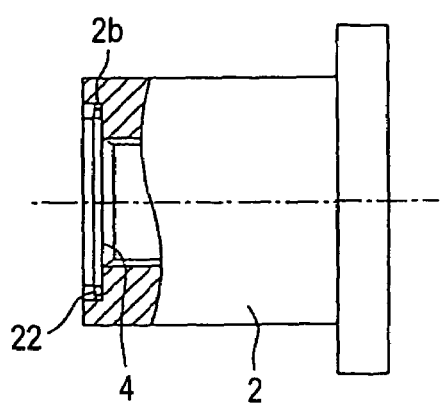

By the way, instead of the elastic member 21 shown in FIG. 6, there may also be used an elastic member 22 having such a shape as shown in FIG. 8. In case where such polygonal-shaped elastic member 22 is used, when compared with the case in which such a circular-shaped elastic member as shown in FIG. 6 is used, a portion of the position for pressing the seal 4 is present nearer to a screw shaft (not shown) (see FIG. 9A which is a front view of a ball screw and FIG. 9B which is a partially broken side view of the ball screw), which makes it possible to control the flexing of the seal 4 down to a small level. Therefore, the sealing performance of the seal 4 can be enhanced.

Figure 10A:
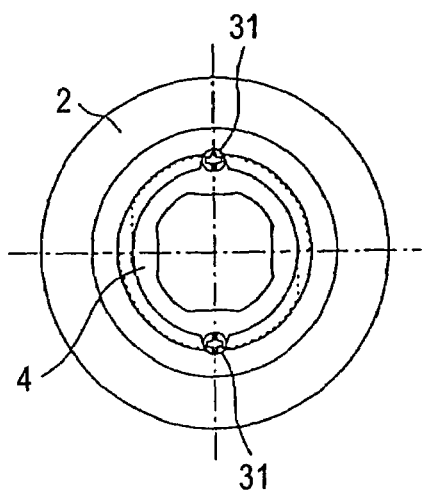
FIGS. 10A and 10B are a front view and a partially broken side view of a ball screw of a type in which a seal is fixed using screw.
Figure 10B:
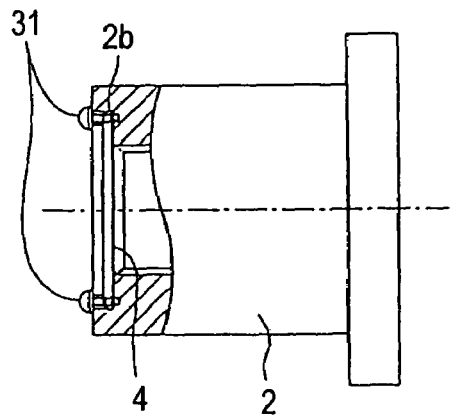

Next, description will be given below of an example in which the seal 4 is fixed using screws 31. Here, FIG. 10A is a front view of a ball screw in which the seal 4 is fixed using the screws 31, while FIG. 10B is a partially broken side view of the present ball screw. By the way, in FIG. 10, illustration of a screw shaft is omitted.

After a tap hole or the like is formed at a given position in the nut 2 and seal 4, in case where the seal 4 is fixed using the screws 31, there is no fear that the seal 4 can be removed from the nut 2 during use of the ball screw. Also, there is no fear either that the seal 4 can be rotated during use of the ball screw.

Figure 11A:
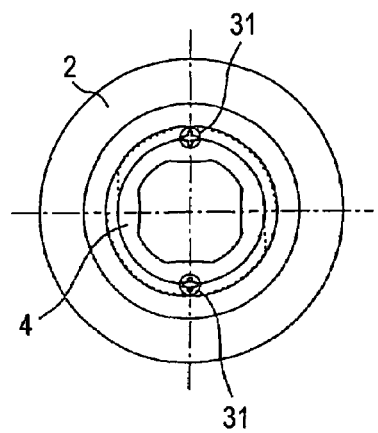
FIGS. 11A and 11B are a front view and a partially broken side view of a ball screw of a type in which a seal is fixed using a screw.
Figure 11B:
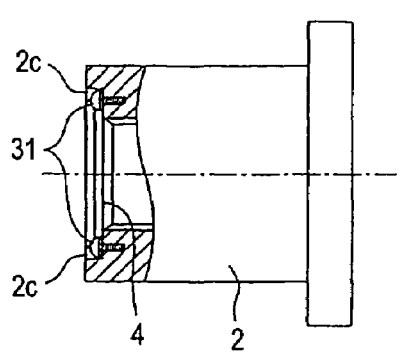

By the way, in case where the shape of the seal introduction groove 2c is formed as such a shape that allows the head portions of the screws 31 to be stored therein, as shown in FIGS. 11A and 11B, the head portions of the screws 31 can be stored in the interior of the nut 2.

Also, the seal 4 can be fixed to the nut 4 using pins instead of the screws 31.

Now, description will be given below of the preferred embodiments of a linear guide apparatus according to the present invention with reference to the accompanying drawings.

Figure 12:
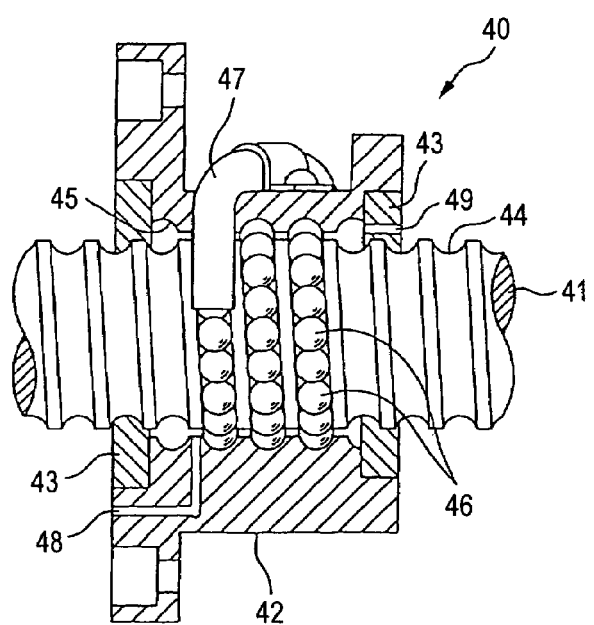
FIG. 12 is a section view of a ball screw according to an embodiment of the present invention.
Figure 13:
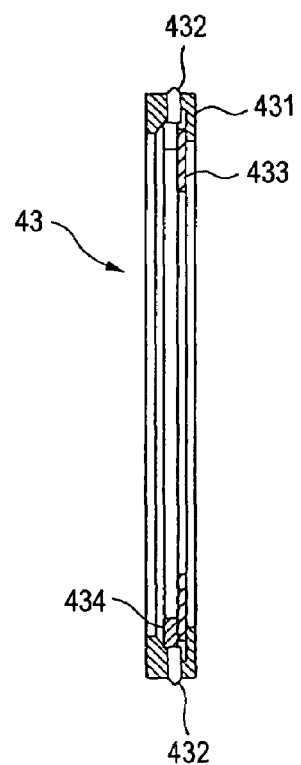
FIG. 13 is a section view of a seal unit shown in FIG. 1.
Figure 14:
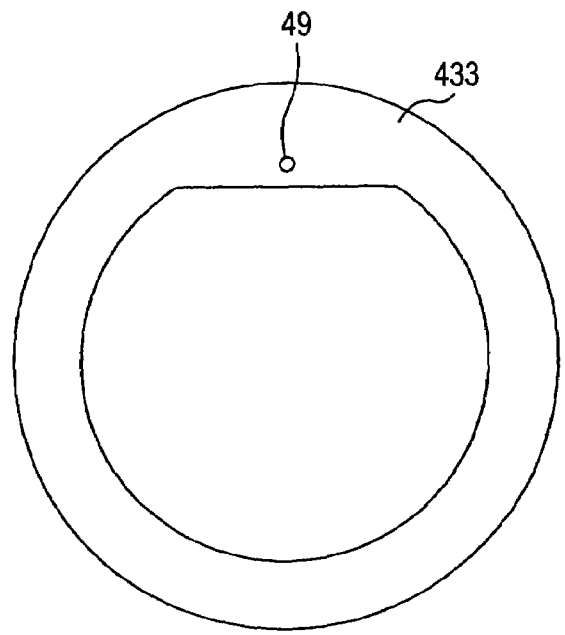
FIG. 14 is a front view of an annular-shaped sealing member shown in FIG. 13.

FIGS. 12 to 14 show an embodiment of the mode for carrying out the present invention. Specifically, FIG. 12 is a section view of a ball screw according to an embodiment of the present invention. As shown in FIG. 12, a ball screw 40 according to the embodiment of the present invention comprises a screw shaft 41 serving as a guide shaft, a nut 42 serving as a movable body to be screwed together with the outer periphery of the screw shaft 41, and a pair of seal units 43 respectively assembled to the two end portions of the nut 42, while a spiral-shaped rolling element rolling groove (which is hereinafter referred to as a ball screw groove) 44 is formed in the outer peripheral surface of the screw shaft 41.

This ball screw groove 44 is disposed opposed to a ball screw groove 45 which is formed in the inner peripheral surface of the nut 42; and, in case where either the screw shaft 41 or nut 42 is rotated, a large number of spherical-shaped rolling elements (balls) 46 incorporated into the nut 42 are allowed to roll between the ball screw grooves 44, 45. By the way, the spherical-shaped rolling elements 46, which have rolled between the ball screw grooves 44 and 45, are then allowed roll within a return tube 47 assembled to the nut 42 and are returned to their respective original positions. Also, a lubricant such as grease is to be supplied to the groove surface of the ball screw groove 45 from a lubricant supply hole 48 which is formed in the nut 42.

Each of the seal unit 43, as shown in FIG. 13, includes a ring-shaped seal housing 431 and a plurality of fixing pins 432 for fixing the seal housing 431 to the nut 42, while an annular-shaped sealing member 433 is disposed within the seal housing 431.

The annular-shaped sealing member 433 is made of material (for example, resin) softer than the material of the screw shaft 41. Also, the annular-shaped sealing member 433 is formed as a thin-type sealing member having a thickness of approx. 0.5 mm, while it has an inner periphery edge portion which can be slidingly contacted with the groove surface of the ball screw groove 44 formed in the outer peripheral surface of the screw shaft 41. By the way, in the interior of the seal housing 431, in addition to the above-mentioned annular-shaped sealing member 433, there is disposed a C-shaped hold member 434 which is used to press the annular-shaped sealing member 433 against the inner surface of the seal housing 431.

Now, FIG. 14 is a front view of the annular-shaped sealing member 433 and, as shown in FIG. 14, in the annular-shaped sealing member 433, there is opened up a ventilation hole 49. That is, the air sealed in the interior of the nut 42, on which the annular-shaped sealing member 433 is to be mounted, can be escaped through the ventilation hole 49 to the outside.

In case where the ventilation hole 49 is formed in the annular-shaped sealing member 433 in this manner, the interior of the nut 42 sealed by the annular-shaped sealing member 433 is allowed to communicate with the outside of the nut 42 through the ventilation hole 49. Due to this, even when a lubricant such as grease is supplied to the interior of the nut 42 from the lubricant supply hole 48, the flow of the lubricant is not impeded by the air sealed in the interior of the nut 42 but the lubricant supplied to the interior of the nut 42 from the lubricant supply hole 48 is allowed to flow smoothly on the groove surface of the ball screw groove 45. Therefore, even in case where the interior of the nut 42 is sealed by the annular-shaped sealing member 433, the lubricant such as grease can be supplied uniformly over the entire area of the groove surface of the ball screw groove 45 formed in the inner peripheral surface of the nut 42.

Also, when the lubricant is supplied to the interior of the nut 42 from the lubricant supply hole 48, there is eliminated the possibility that the annular-shaped sealing member 433 can be elastically deformed by the air sealed into the nut 42 to thereby generate a pressure difference between the interior and exterior of the nut 42. This not only can prevent the lubricant from leaking from the ball screw groove surfaces but also can prevent a foreign substance from being sucked into the ball screw groove surfaces. Also, in case where the lubricant supply hole 48 is not closed, there can be avoided a pressure difference which could be otherwise generated between the interior and exterior of the nut 42 due to variations in the pressures thereof caused during the operation of the ball screw 40. This can also prevent the ball screw groove surfaces from leaking the lubricant therefrom and from sucking a foreign substance thereinto.

Figure 15:
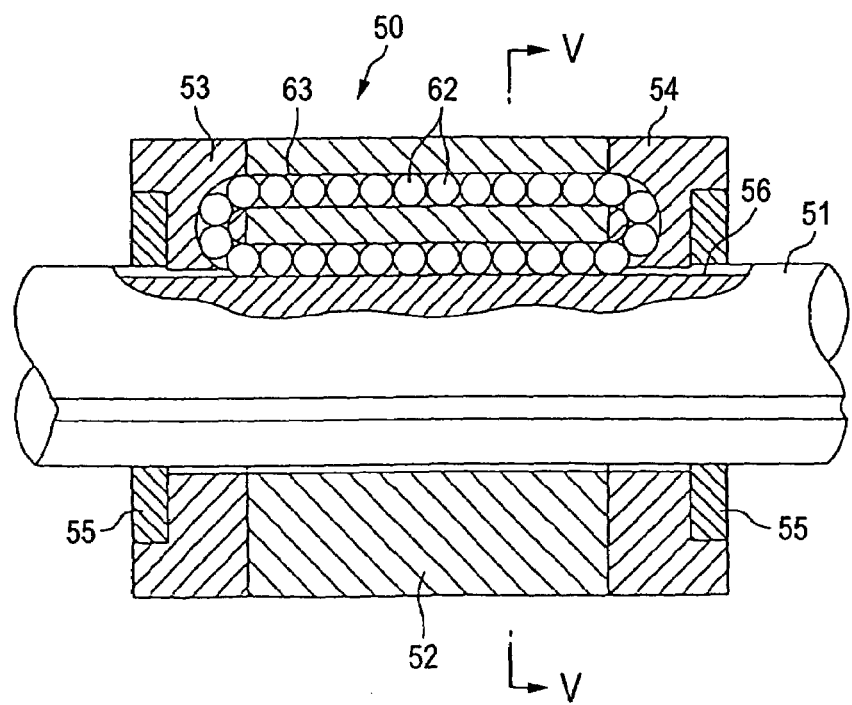
FIG. 15 is a section view of a ball spline according to an embodiment of the present invention.
Figure 16:
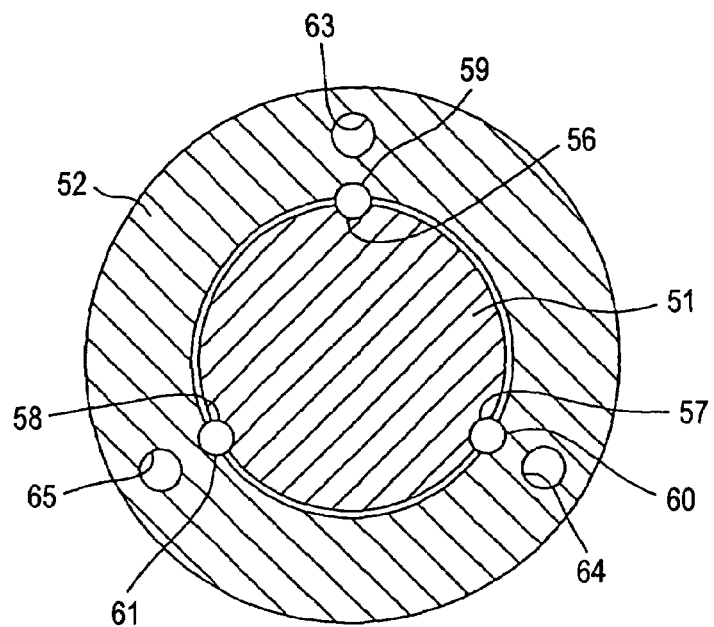
FIG. 16 is a section view taken along the arrow line V—V shown in FIG. 15.

Now, FIGS. 15 to 18 show a ball spline according to an embodiment of the present invention. Specifically, FIG. 15 is a section view of a ball spline according to the embodiment of the present invention, and FIG. 16 is a section view taken along the arrow line V—V shown in FIG. 15. As shown in FIGS. 15 and 16, a ball spline 50 according to the embodiment of the present invention comprises a spline shaft 51 serving as a guide shaft, a spline nut 52 serving as a movable body to be screwed together with the outer periphery of the spline shaft 51, and a pair of seal units 55 respectively assembled to the two ends of the spline nut 52 through their associated end caps 53, 54; and, in the outer peripheral surface of the spline shaft 51, there are formed linear-shaped rolling element rolling grooves (which are hereinafter referred to as spline grooves) 56, 57, 58 (see FIG. 16) in such a manner that they extend along the axial direction of the spline shaft 51.

These spline grooves 56, 57, 58 are respectively opposed to spline grooves 59, 60, 61 which are formed in the inner peripheral surface of the spline nut 52. And, in case where either the spline shaft 51 or spline nut 52 is moved in the axial direction of the spline shaft 51, a large number of spherical-shaped rolling elements 62 incorporated into the spline nut 52 are allowed to roll between the mutually opposed ones of the spline grooves 56–61. By the way, the spherical-shaped rolling elements 62, which have rolled-between the spline grooves 56–61, are then allowed to roll along their associated rolling element return passages 63, 64, 65 (see FIG. 16) which are formed in the spline nut 52, and are returned back to their original positions. Also, a lubricant such as grease is to be supplied to the groove surfaces of the spline grooves 59, 60, 61 formed in the inner peripheral surface of the spline nut 52 from a lubricant supply hole (not shown) formed in the spline nut 52.

Figure 17:
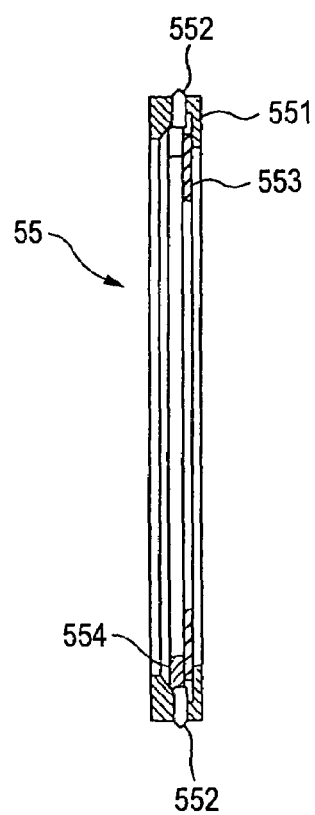
FIG. 17 is a section view of a seal unit shown in FIG. 15.

Each of the seal units 55, as shown in FIG. 17, includes a ring-shaped seal housing 551 and a plurality of fixing pins 552 which are used to fix the seal housing 551 to the spline nut 52, while an annular-shaped sealing member 553 is disposed in the interior of the seal housing 551.

The annular-shaped sealing member 553 is made of material (for example, resin) which is softer than the material of the spline shaft 51. Also, the annular-shaped sealing member 553 is formed as a thin body having a thickness of approx. 0.5 mm and it includes in the inner peripheral edge portion thereof projection portions 553a–553c (see FIG. 18) which can be slidingly contacted with the groove surfaces of the spline grooves 56–58 formed in the outer peripheral surface of the spline shaft 51. By the way, in the interior of the seal housing 551, besides the above-mentioned annular-shaped sealing member 553, there is disposed a C-shaped hold member 554 which is used to press the annular-shaped sealing member 553 against the inner surface of the seal housing 551.

Figure 18:
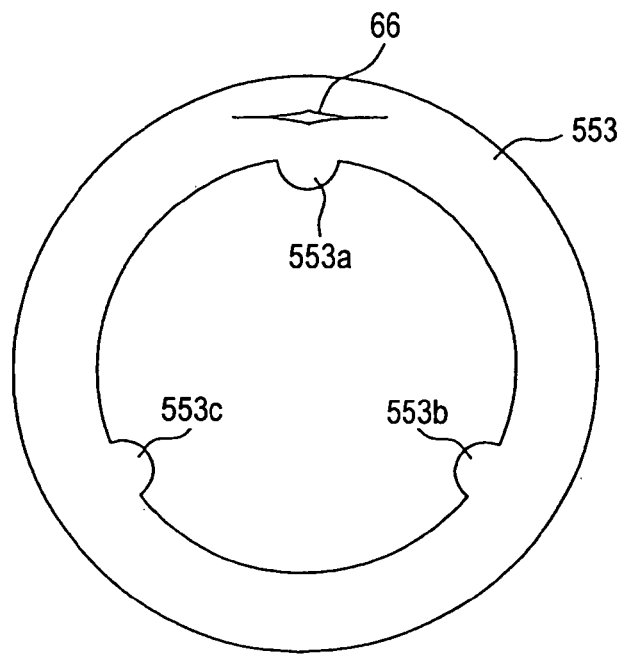
FIG. 18 is a front view of an annular-shaped sealing member shown in FIG. 17.

Now, FIG. 18 is a front view of the annular-shaped sealing member 553. As shown in FIG. 18, in the annular-shaped sealing member 553, there is formed a ventilation slit 66 for allowing the air existing in the interior of the spline nut 52, on which the annular-shaped sealing member 553 is to be mounted, to escape to the outside.

In case where the ventilation slit 66 is formed in the annular-shaped sealing member 553 in this manner, the interior of the spline nut 52 sealed by the annular-shaped sealing member 553 is allowed to communicate with the outside of the spline nut 52 through the ventilation slit 66. Due to this, even when a lubricant such as grease is supplied to the interior of the spline nut 52 from the lubricant supply hole, the flow of the lubricant is not impeded by the air sealed in the interior of the spline nut 52 but the lubricant supplied to the interior of the spline nut 52 from the lubricant supply hole is allowed to flow smoothly on the groove surfaces of the spline grooves 59–61. Therefore, even in case where the interior of the spline nut 52 is sealed by the annular-shaped sealing member 553, the lubricant such as grease can be supplied uniformly over the entire area of the groove surfaces of the spline grooves 59–61 formed in the inner peripheral surface of the spline nut 52.

Also, when the lubricant is supplied to the interior of the spline nut 52 from the lubricant supply hole, there is eliminated the possibility that the annular-shaped sealing member 553 can be elastically deformed by the air sealed into the spline nut 52 to thereby generate a pressure difference between the interior and exterior of the spline nut 52. This not only can prevent the lubricant from leaking from the spline grooves but also can prevent a foreign substance from being sucked into the spline grooves.

Figure 19:
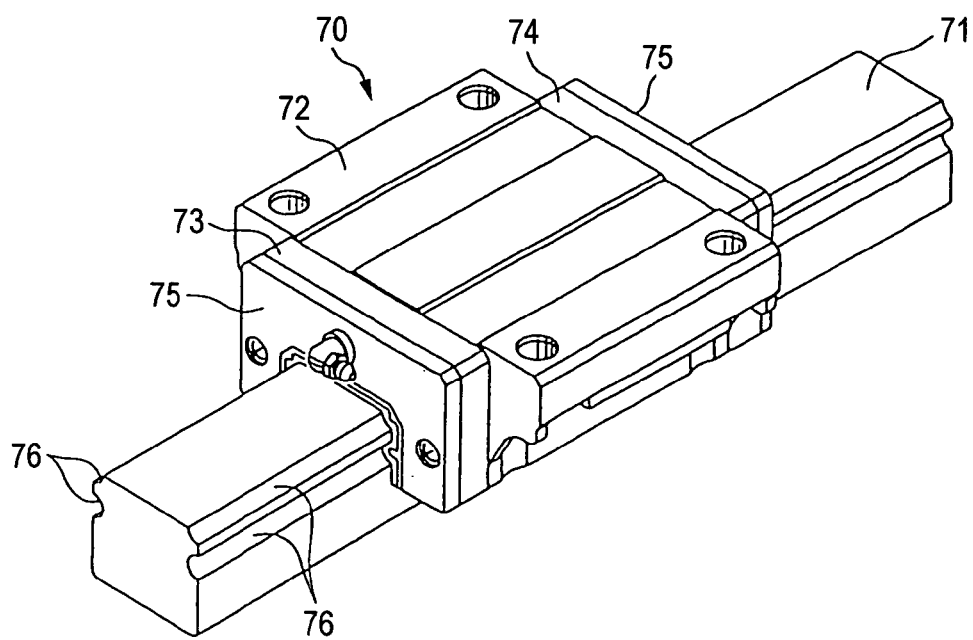
FIG. 19 is a perspective view of a linear guide according to an embodiment of the present invention.
Figure 20:
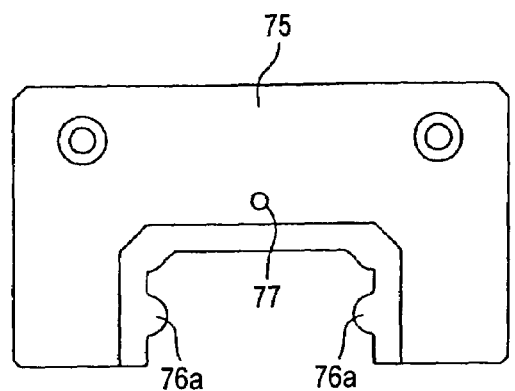
FIG. 20 is a front view of a side sealing member shown in FIG. 19.

Now, FIGS. 19 and 20 show a linear guide apparatus according to an embodiment of the present invention. Specifically, FIG. 19 is a perspective view of a linear guide according to the embodiment of the present invention. As shown in FIG. 19, a linear guide 70 according to the embodiment of the present invention comprises a guide rail 71 serving as a guide shaft, a slider 72 serving as a movable body disposed on the guide rail 71 so as to astride it, and a pair of side sealing members 75 respectively mounted on the two ends of the slider 72 through their associated end caps 73, 74; and, in the right and left side surfaces of the guide rail 71, there are formed rolling element rolling grooves 76 in such a manner that they extend along the longitudinal direction of the guide rail 71.

These rolling element rolling grooves 76 are disposed opposed to rolling element rolling grooves (not shown) which are formed in the inner surface of the slider 72; and, in case where either the guide rail 71 or slider 72 is moved in the longitudinal direction of the guide rail 71, a large number of spherical-shaped rolling elements (not shown) incorporated into the slider 72 are allowed to roll between the above-mentioned mutually opposed rolling element rolling grooves. By the way, the spherical-shape rolling elements, which have rolled between the rolling element rolling grooves, are then allowed to roll along a rolling element return passage formed in the slider 72 and are returned to their original positions. Also, to the groove surfaces of the rolling element rolling grooves formed in the inner surface of the slider 72, there can be supplied a lubricant such as grease from a lubricant supply hole (not shown) which is formed in the slider 72.

Now, FIG. 20 is a front view of the side sealing member 75 and, as shown in FIG. 20, in the side sealing member 75, there is formed a ventilation hole 77. By the way, the side sealing member 75 is formed in a gate-like shape; and, on the inner surface of the side sealing member 75, there are projectingly disposed lip portions 76a which can be slidingly contacted with the rolling element rolling grooves 76 of the guide rail 71.

In case where the ventilation hole 77 is formed in the side sealing member 75 in this manner, the interior of the slider 72 sealed by the side sealing member 75 is allowed to communicate with the exterior of the slider 72 through the ventilation hole 77. Due to this, even when a lubricant such as grease is supplied to the interior of the slider 72 from the lubricant supply hole, the flow of the lubricant is not impeded by the air sealed in the interior of the slider 72 but the lubricant supplied to the interior of the slider 72 from the lubricant supply hole is allowed to flow smoothly on the groove surfaces of the rolling element rolling grooves formed in the inner surface of the slider 72. Therefore, even in case where the interior of the slider 72 is sealed by the side sealing member 75, the lubricant such as grease can be supplied uniformly over the entire area of the groove surfaces of the rolling element rolling grooves formed in the inner surface of the slider 72.

Also, when the lubricant is supplied to the interior of the slider 72 from the lubricant supply hole, there is eliminated the possibility that the side sealing member 75 can be elastically deformed by the air sealed into the slider 72 to thereby generate a pressure difference between the interior and exterior of the slider 72. This not only can prevent the lubricant from leaking from the rolling element rolling grooves but also can prevent a foreign substance from being sucked into the rolling element rolling grooves.

Figure 21A:
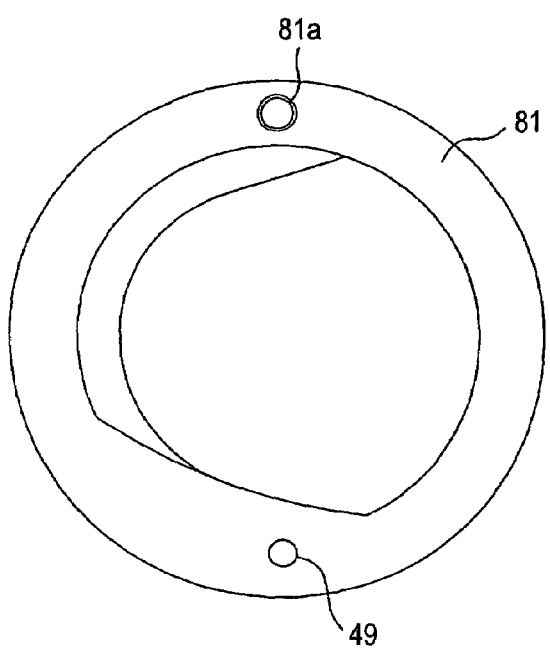
FIGS. 21A and 21B show an embodiment according to the present invention; specifically.
Figure 21B:
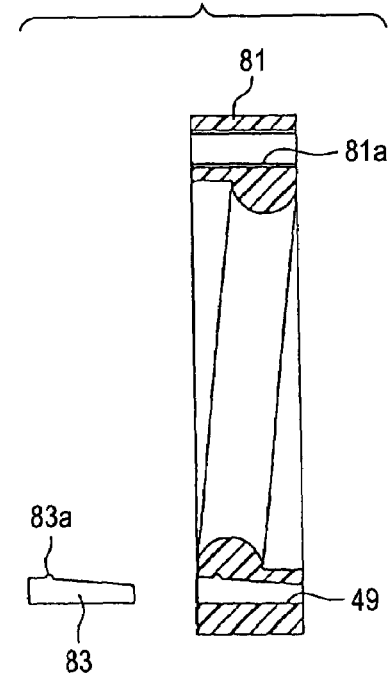

By the way, the present invention is not limited to the above illustrated embodiments. For example, in the embodiment, there is shown a ball screw of a return tube type using the return tube 47 as a ball circulating part; however, the present invention can also be applied to a ball screw which uses an end cap or a circulation frame instead of the return tube. Also, in the embodiment, the annular-shaped sealing member 433 having a thickness of approx. 0.5 mm is used as an annular-shaped sealing member for sealing the clearance between the screw shaft 41 and nut 42; however, as in an embodiment shown in FIGS. 21A and 21B, as an annular-shaped sealing member for sealing the clearance between a screw shaft and a nut, there may be used a Labyrinth seal 81, a ventilation hole (or a ventilation slit) 49 or 81a may be formed in the Labyrinth seal 81, and a female screw portion may be formed in the ventilation hole 81a.

Also, during the operation of the ball screw, the ventilation hole 49 may be closed, for example, by a closing member 83 (see FIGS. 21A and 21B) having a fixing projection 83a. In case where the ventilation hole 49 is closed in this manner during the operation of the ball screw, the lubricant can be prevented from leaking from the ventilation hole 49. By the way, in case where the ventilation hole 49 is formed in the annular-shaped sealing member 433, preferably, the ventilation hole 49 may be closed using an adhesive seal.

As has been described heretofore, a ball screw according to the present invention allows easy insertion of a seal thereinto and is excellent in the reliability and sealing performance of the seal.

As has been described heretofore, according to the linear guide apparatus of the present invention, even when the interior of the movable body is sealed by the sealing members mounted on the two ends of the movable body, the lubricant can be supplied uniformly over the entire area of the rolling element rolling grooves of the movable body. Also, even in case where the thickness of the sealing member is small, there is eliminated a possibility that the sealing member can be elastically deformed by the air sealed into the interior of the movable body to thereby generate a pressure difference between the interior and exterior of the movable body, which makes it possible not only to prevent the lubricant from leaking out of the rolling element rolling grooves but also to prevent a foreign substance from being sucked into the rolling element rolling grooves.

What is claimed is:

1. A ball screw comprising:
   a screw shaft including a spiral-shaped screw groove formed in an outer peripheral surface thereof;
   a nut including a spiral-shaped screw groove formed in an inner peripheral surface thereof so as to be opposed to the screw groove of the screw shaft and screwed together with the screw shaft through a large number of balls rollably disposed in a spiral-shaped ball rolling passage formed by the two screw grooves; and,
   two seals respectively disposed on the two end portions of the nut for sealing the opening of a clearance between the screw shaft and the nut,
   wherein two annular grooves are respectively formed in the inner peripheral surfaces of the two end portions of the nut, each of the seals is formed in a substantially thin-annular-ring shape having an outside diameter larger than the inside diameter of the nut and the seals are mounted into the nut by fitting the outer edge portions of the seals into the annular grooves.

2. The ball screw as set forth in claim 1, wherein elastic member having a substantially C-shape is fitted together with the seals into the annular grooves to thereby fix the seal to the nut.

3. The ball screw as set forth in claim 1, wherein at least one cut-away portion or slit is formed in the outer edge portion of the seal.

4. The ball screw as set forth in claim 3, wherein elastic member having a substantially C-shape is fitted together with the seals into the annular grooves to thereby fix the seal to the nut.

5. The ball screw as set forth in claim 4, wherein the seal includes a closing member so as to close the ventilation hole or the ventilation slit during the operation of the ball screw.

6. The ball screw as set forth in claim 1, wherein the seal is fixed to the nut by using screws or pins.

7. A ball screw comprising:
   a screw shaft including a spiral-shaped screw groove formed in an outer peripheral surface thereof;
   a nut including a spiral-shaped screw groove formed in an inner peripheral surface thereof so as to be opposed to the screw groove of the screw shaft and screwed together with the screw shaft through a large number of balls rollably disposed in a spiral-shaped ball rolling passage formed by the two screw grooves; and,
   two seals respectively disposed on the two end portions of the nut for sealing the opening of a clearance between the screw shaft and the nut,
   wherein two annular grooves are respectively formed in the inner peripheral surfaces of the two end portions of the nut, each of the seals is formed in a substantially annular-ring shape having an outside diameter larger than the inside diameter of the nut and the seals are mounted into the nut by fitting the outer edge portions of the seals into the annular grooves, and
   wherein, in the inner peripheral surfaces of the two end portions of the nut, seal introduction grooves which allow the end face of the nut and the annular grooves to communicate with each other are formed.

8. The ball screw as set forth in claim 7, wherein at least one cut-away portion or slit is formed in the outer edge portion of the seal.

9. The ball screw as set forth in claim 8, wherein elastic member having a substantially C-shape is fitted together with the seals into the annular grooves to thereby fix the seal to the nut.

10. The ball screw as set forth in claim 7, wherein elastic member having a substantially C-shape is fitted together with the seals into the annular grooves to thereby fix the seal to the nut.

11. A ball screw
    a screw shaft including a spiral-shaped screw groove formed in an outer peripheral surface thereof;
    a nut including a spiral-shaped screw groove formed in an inner peripheral surface thereof so as to be opposed to the screw groove of the screw shaft and screwed together with the screw shaft through a large number of balls rollably disposed in a spiral-shaped ball rolling passage formed by the two screw grooves; and,
    two seals respectively disposed on the two end portions of the nut for sealing the opening of a clearance between the screw shaft and the nut,
    wherein two annular grooves are respectively formed in the inner peripheral surfaces of the two end portions of the nut, each of the seals is formed in a substantially annular-ring shape having an outside diameter larger than the inside diameter of the nut and the seals are mounted into the nut by fitting the outer edge portions of the seals into the annular grooves, and
    wherein a ventilation hole or a ventilation slit is formed in the seal, and the interior and exterior of the nut are allowed to communicate with each other through the ventilation hole or the ventilation slit.

12. A linear motion apparatus comprising:
    a guide shaft including a spiral-shaped or linear-shaped rolling element rolling groove;
    a movable body including a spiral-shaped or linear-shaped rolling element rolling groove opposed to the rolling element rolling groove of the guide shaft; and, a large number of rolling elements interposed between the two rolling element rolling grooves of the guide shaft and movable body, wherein sealing members are mounted on the two ends of the movable body and the sealing members are slidingly contacted with the guide shaft to thereby seal the clearance between the guide shaft and movable body, wherein a ventilation hole or a ventilation slit is formed in each of the sealing members, and the interior and exterior of the movable body are allowed to communicate with each other through the ventilation hole or ventilation slit.

13. The linear guide apparatus as set forth in claim 12, wherein the sealing member includes a closing member so as to close the ventilation hole or the ventilation slit during the operation of the linear guide apparatus.

* * * * *